(12) United States Patent  (10) Patent No.: US 9,409,494 B2
Gunasekaran  (45) Date of Patent: Aug. 9, 2016

(54) MAGNETICALLY SUSPENDED VEHICLE

(71) Applicant: Keerthi Gunasekaran, Eden Prairie, MN (US)

(72) Inventor: Keerthi Gunasekaran, Eden Prairie, MN (US)

( * ) Notice: Subject to any disclaimer, the term of this patent is extended or adjusted under 35 U.S.C. 154(b) by 307 days.

(21) Appl. No.: 13/903,063

(22) Filed: May 28, 2013

(65) Prior Publication Data

US 2014/0352570 A1  Dec. 4, 2014

(51) Int. Cl.
*B60L 13/00* (2006.01)
*B60L 13/04* (2006.01)

(52) U.S. Cl.
CPC ...................... *B60L 13/04* (2013.01)

(58) Field of Classification Search
CPC ............................................ B60L 13/00–13/18
See application file for complete search history.

(56) References Cited

U.S. PATENT DOCUMENTS

| | | | | |
|---|---|---|---|---|
| 3,575,454 A * | 4/1971 | Meeker | ........................ | 293/127 |
| 3,631,806 A * | 1/1972 | Barthalon | ........................ | 104/89 |
| 3,777,834 A * | 12/1973 | Hiraoka et al. | ........................ | 180/9.44 |
| 5,289,778 A * | 3/1994 | Romine | ........................ | 104/88.04 |
| 5,615,618 A * | 4/1997 | Berdut | ........................ | 104/290 |
| 5,653,174 A * | 8/1997 | Halus | ........................ | 104/124 |
| 6,202,566 B1 * | 3/2001 | Hutchinson | ........................ | 105/148 |
| 7,224,252 B2 * | 5/2007 | Meadow et al. | ........................ | 335/296 |
| 2014/0130703 A1 * | 5/2014 | Wamble, III | ........................ | 104/281 |
| 2014/0352570 A1 * | 12/2014 | Gunasekaran | ........................ | 104/281 |

* cited by examiner

*Primary Examiner* — Jason C Smith

(57) ABSTRACT

Generally discussed herein are magnetically suspended vehicle apparatuses, vehicles, and techniques related thereto. In one or more embodiments a vehicle configured to be magnetically suspended may include a steering mechanism, a propulsion mechanism coupled to the steering mechanism, a first end of a stem coupled to the propulsion mechanism, at least one wheel coupled to the propulsion mechanism, and at least one magnet coupled to the stem, wherein the magnet is configured to suspend the vehicle from a ferrous surface when the magnet is situated at or near the ferrous surface.

7 Claims, 10 Drawing Sheets

MAGNETICALLY SUSPENDED VEHICLE

TECHNICAL FIELD

The disclosure relates generally to travel by a vehicle such as an automobile or bicycle, and more particularly, by a magnetically suspended vehicle.

BACKGROUND

There are many carts, devices and or carriages that rely upon rails, tracks, ropes, or cables for propulsion or guidance. Commuter trains, for example, ride on tracks or railways. The train engine may pull a sequential link of carriages on the tracks or railway. One of the disadvantages of the track or railway system is that the individual carriages are not easily or "at will" interchangeable in their order on a track. The difficulty in interchanging the carriages may be a lack of individual engines for each carriage or that the carriages are all sequentially laid out, in line, and linked on a single bi-directional track.

The interchangeability problem may also be seen in aerial tramways and telpher systems. The individual cable cars or carriages may be bound to the bi-directional cable or the track from which it is suspended. The limited bi-directionality may limit the cable cars from interchanging their position on the cable or track and may limit them from moving perpendicular to the track. Even if each car on the track is self-propelled or individually motorized, individual cars may still be limited in their movement by the cable car in front or in back of the individual cars.

SUMMARY

In one or more embodiments, a vehicle configured to be magnetically suspended includes a steering mechanism, a propulsion mechanism coupled to the steering mechanism, a first end of a stem coupled to the propulsion mechanism, at least one wheel can be a part of the propulsion mechanism, and at least one magnet coupled to the stem, wherein the at least one magnet is configured to suspend the vehicle from a ferrous surface when the at least one magnet is situated at or near the ferrous surface.

In one or more embodiments, a system includes a ferrous surface, and a vehicle including at least one magnet magnetically coupled to the ferrous surface, a steering mechanism, a propulsion mechanism coupled to the steering mechanism, a stem including first and second ends, the first end connected to the steering mechanism and the second end connected to the propulsion mechanism, and at least one wheel coupled to and a part of the propulsion mechanism, wherein the at least one magnet is coupled to the stem and configured to suspend the vehicle from the ferrous surface when the at least one magnet is situated at or near the ferrous surface, and wherein the vehicle includes at least one ball bearing situated between the magnet and the ferrous surface.

In one or more embodiments, a method includes receiving, at a propulsion mechanism, a command to move a vehicle magnetically suspended from a ferrous surface, and in response to receiving the command, activating a propulsion mechanism of the vehicle to (1) spin a wheel coupled to the propulsion mechanism and (2) move the vehicle along the ferrous surface.

DETAILED DESCRIPTION

Figure 1:
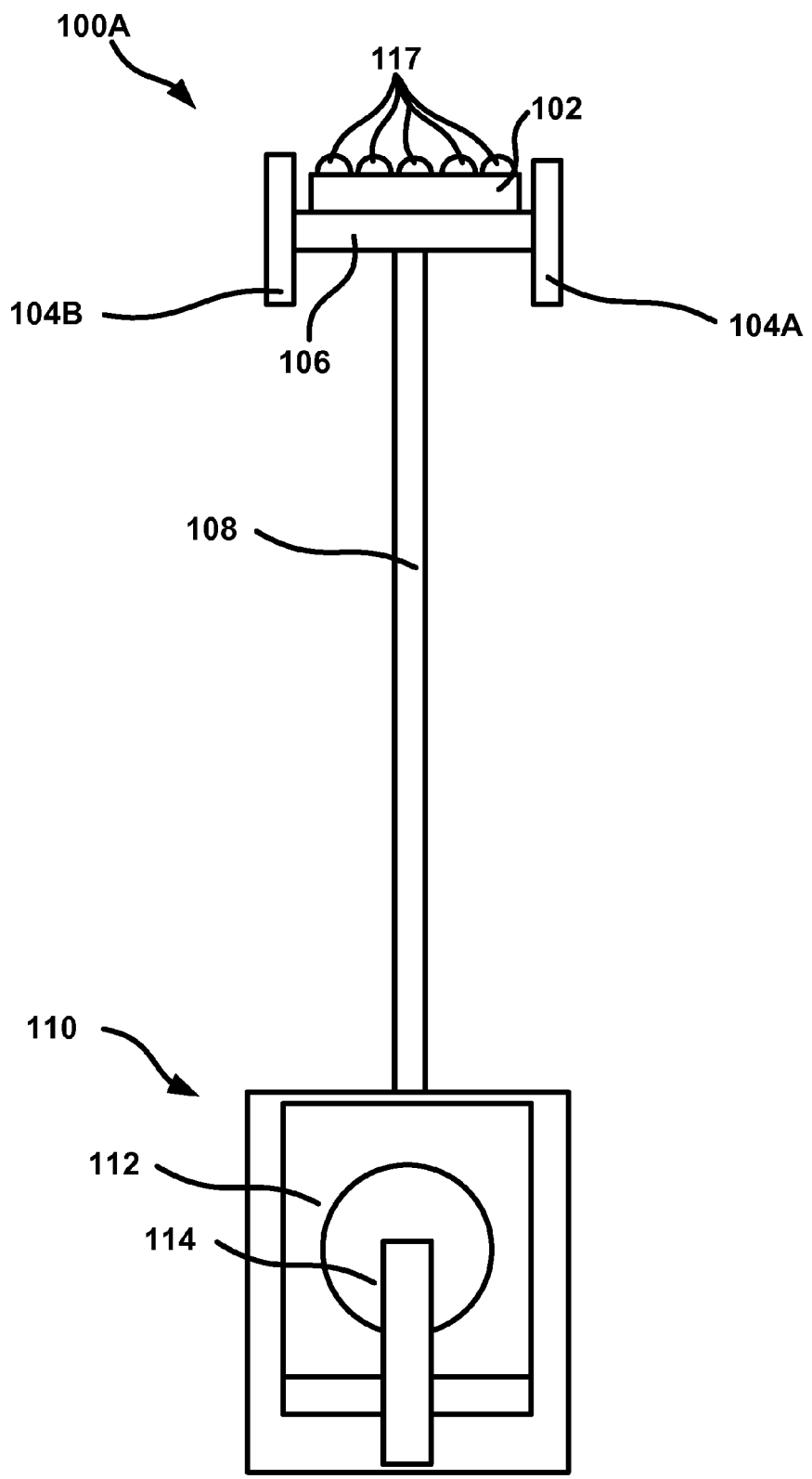
FIG. 1 is a block diagram of an example of a vehicle configured for magnetic suspension.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical, and electrical changes may be made without departing from the scope of the present disclosure. The following description of example embodiments is, therefore, not to be taken in a limited sense, and the scope of the present disclosure is defined by the appended claims.

Carts that run on bi-directional tracks may pose one or more limitations in one or more applications. For example, consider a user in a cart that is suspended from a track or a cable. If that user wishes to stop or spend more time in a zone of interest, or wishes to move left or right in a zone of interest, they may be restricted, as they are restricted by the track or cable or by either the carts behind or in front of them, as well. In some circumstances the carts may not have individual motors or may move at a specific pre-determined pace in a specific pre-determined direction, both of which may also restrict the user's control of the cart. They may also be restricted if the cart does not have an individual motor, in some circumstances the carts may move at a specific pre-determined pace in a specific pre-determined direction.

It may be advantageous to provide a user with an amount of X-Y and even some Z direction movement in certain circumstances. For example, such mobility may be advantageous in environments where ground contact or ground motion is difficult or not possible, or in environments where the use of motorized propellers or tires is restricted, such as in exploring a canyon, diving into a coral reef, or exploring a crime scene to take pictures and collect samples. In such environments, it may be advantageous to provide left-right (e.g., X and Y), or forward-backward maneuverability for one or more individually suspended units and at the same time, be able to achieve this mobility without touching the ground or certain objects in the environment. It may also be advantageous, in some such situations, to allow a user to be aerially suspended and able to move in the X-Y and Z directions independently, instead of following a predetermined pathway of a track, rail, or cable.

A vehicle that is capable of travelling while magnetically suspended may allow for travel in places that would normally be difficult to reach through other known means is discussed generally herein. The vehicle may include a waterproof encasing that allows a person riding in the vehicle to partake in activities that are normally difficult in some locations. For instance, it is difficult to write while under water, or read while outside in the wind. Such a vehicle may allow a user to observe their surroundings while still maintaining the ability to partake in such normally difficult activities. One or more embodiments discussed herein may present a vehicle that does not pollute the area it is travelling through. This feature may be important when the vehicle is travelling through certain areas, such as coral reefs, which may be sensitive to pollution.

Vehicles may be used for under water navigation, aerial navigation, research, or entertainment. For instance, a vehicle may be used for navigating and studying coral reefs. As another example, a suspended vehicle may allow a user to access and navigate a jungle canopy to, for example, study a rainforest canopy. A vehicle may allow a user to drive through an aquarium, and possibly come face-to-face with a shark. A vehicle may also be used for other amusement rides.

FIG. 1 illustrates an example of a vehicle 100A. Vehicle 100A may comprise a magnet 102, a propulsion mechanism 106, one or more wheels 104A-B, a stem 108, and/or an optional cockpit 110. Note the reference number 100 refers to vehicles in general to describe configurations of the vehicles described herein (e.g., 100A, 100B, 100C, etc.).

Figure 3:
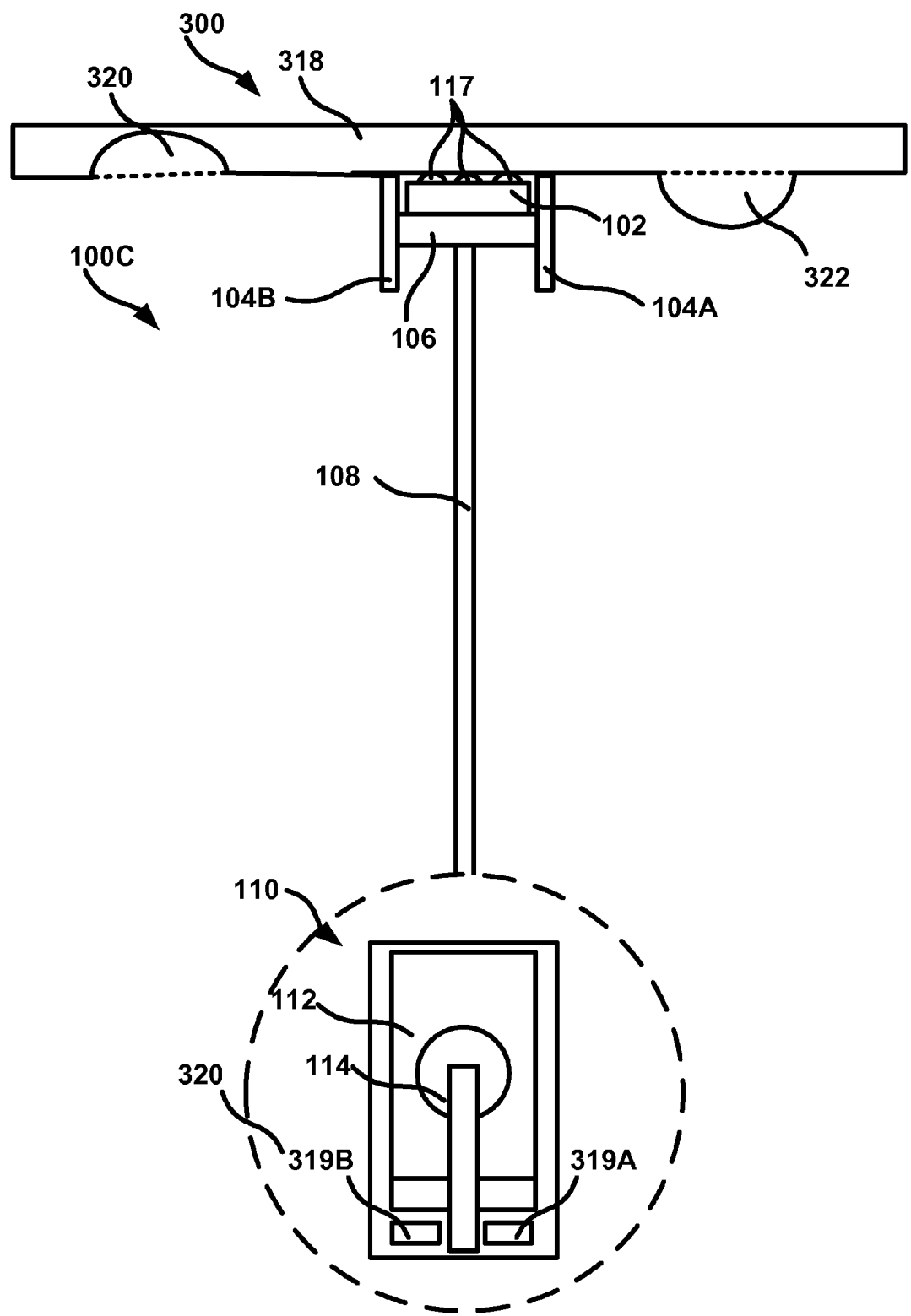
FIG. 3 is a block diagram of an example of a system configured to magnetically suspend a vehicle.

The magnet 102 may operate to suspend the vehicle 100A when the magnet is situated at or near a ferrous surface 318 (see FIG. 3). The magnet 102 may have an associated magnetic force that, when situated appropriately (e.g., at or near a ferrous surface or ceiling), is sufficient to suspend the vehicle 100A and any people or objects in or on the cockpit 110 and any other external forces that the vehicle 100A may be subjected to. The magnet 102 may be a permanent magnet. The magnet 102 may include neodymium, iron, cobalt, samarium cobalt, alnico, ceramic, ferrite, or a combination thereof, among others. The magnet 102 may be an electro-magnet. The magnet 102 may include iron, steel, ceramic, ferrite, Mu-metal, nickel copper, chromium, molybdenum, or a combination thereof, among others.

The propulsion mechanism 106 may include and operate to spin the one or more wheels 104A-B. The propulsion mechanism 106 may be electrically or mechanically coupled to a steering mechanism 114. The propulsion mechanism 106 may receive a command (e.g., receive an electrical signal or be subjected to a mechanical force) to spin the one or more wheels 104A-B. The propulsion mechanism 106 may include foot or hand pedals, one or more toothed cogs, one or more chains configured to mechanically couple the one or more toothed cogs to the one or more wheels 104A-B. The propulsion mechanism 106 may include a motor coupled to the one or more wheels 104A-B, such as through an axle 428.

The one or more wheels 104A-B are operable to provide mechanical advantage sufficient to move the vehicle 100A on the ferrous surface 318. The one or more wheels 104A-B may be made of various materials and may include varying shapes and sizes.

Figure 7:
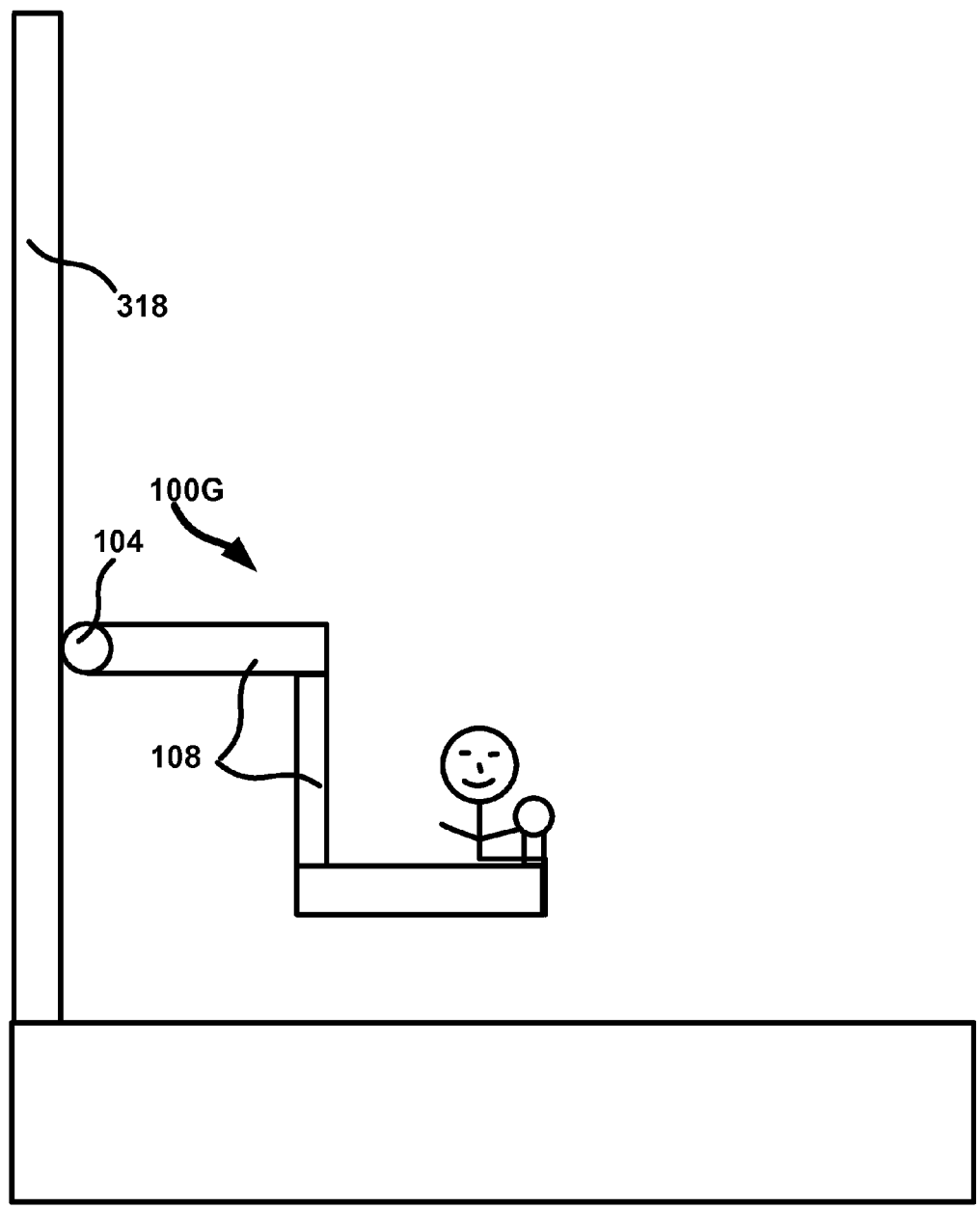
FIG. 7 is a block diagram of an example of another system configured to magnetically suspend a vehicle.

The stem 108 may operate to provide mechanical support for the vehicle 100A or to provide space between a ferrous surface, such as ferrous surface 318 and the optional cockpit 110. The stem 108 may be mechanically coupled to the propulsion mechanism 106, the cockpit 110, or a steering mechanism 114. The stem 108 of a vehicle 100 may include a bend configured to allow a user to sit upright while using the vehicle 100, such as shown in FIG. 7.

The optional cockpit 110 may be an area for a user to sit or stand in, or an area from which a user may control the vehicle 100A, such as by interacting with the steering mechanism 114 to send commands to the propulsion mechanism 106. The cockpit may include one or more seats 112 or the steering mechanism 114.

Figure 9:
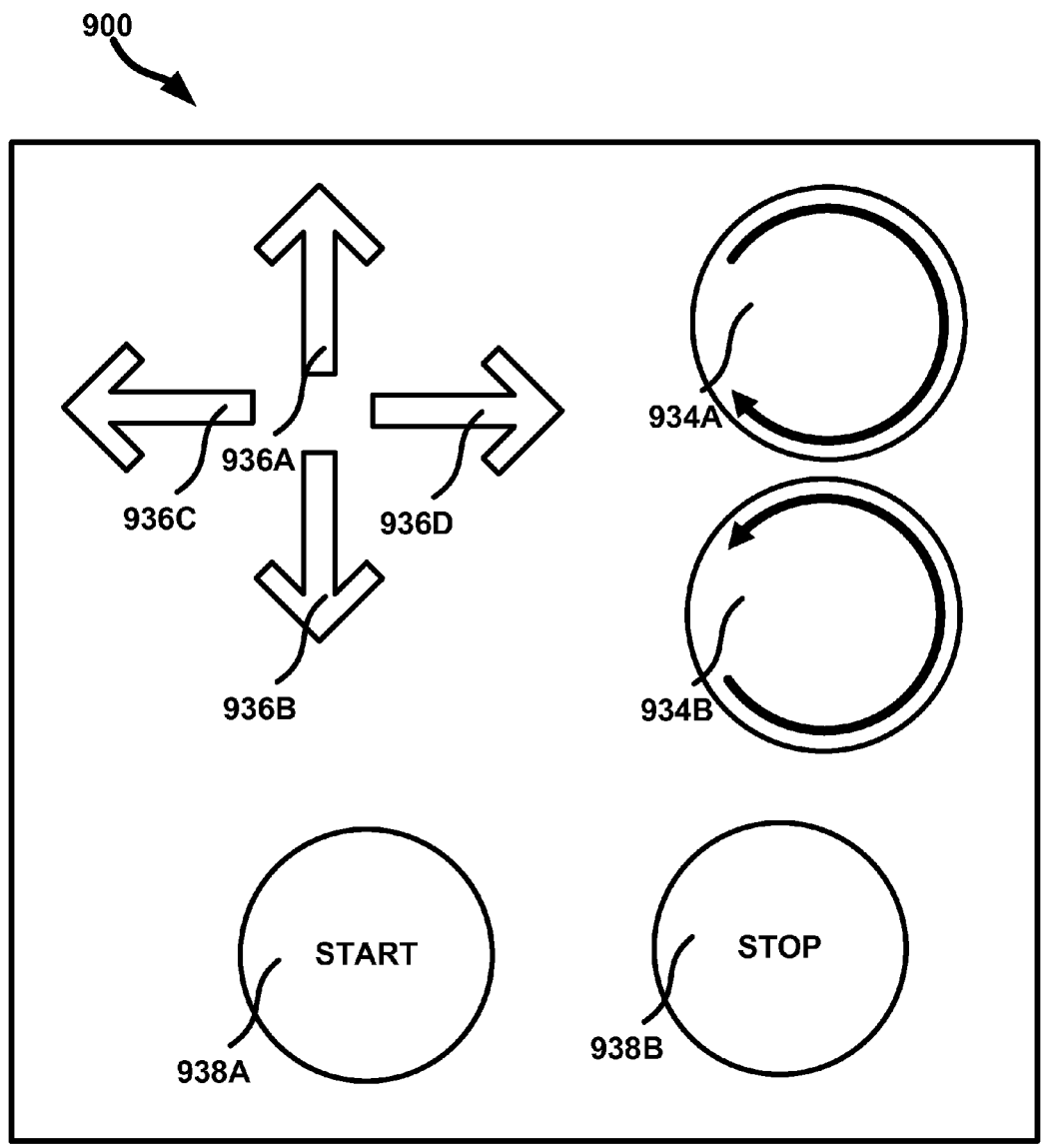
FIG. 9 is a block diagram of an example of a user interface.

The steering mechanism 114 may be operable to allow a user to interact with the propulsion mechanism 106 and control the movement of the vehicle 100A, such as through sending commands to the propulsion mechanism 106. The steering mechanism 114 may include a steering wheel, such as shown in FIG. 1, stop and go pedals 319A and 319B, such as is shown in FIG. 3, an electric or electronic control interface, such as is shown in FIG. 9, wires coupled to the electric or electronic control interface to transmit signals representative of commands to be transmitted to the propulsion mechanism 106, handlebars, or a combination thereof. The steering mechanism 114 may be configured to wirelessly transmit commands to the propulsion mechanism 106. The steering mechanism 114 may be a handheld unit configured to transmit commands to a vehicle 100. The steering mechanism 114, such as a handheld unit, may include a user interface 900, such as the user interface 900 shown in FIG. 9. Such a configuration may allow a user to control the vehicle 100 remotely.

Figure 5:
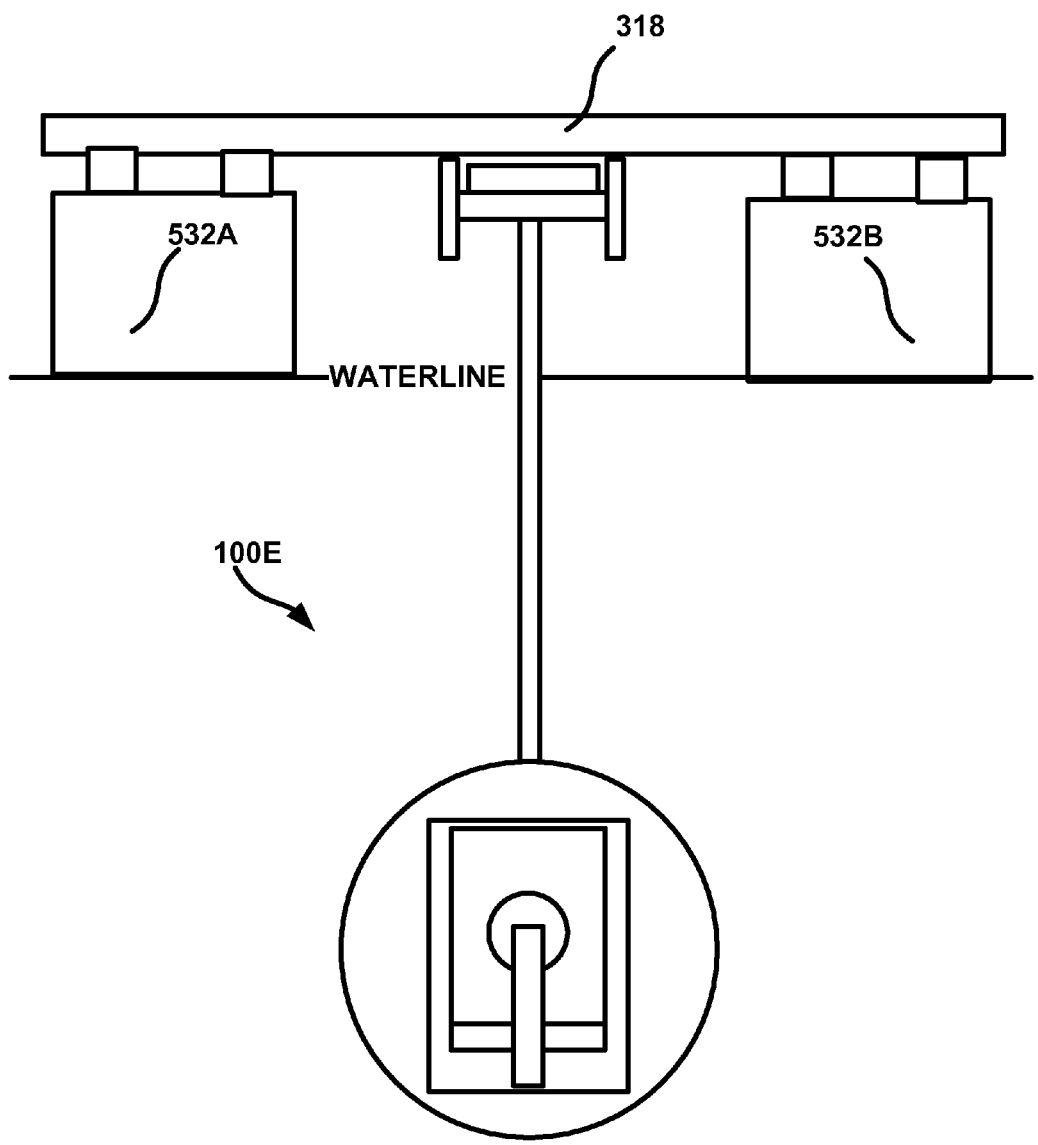
FIG. 5 is a block diagram of an example of another system configured to magnetically suspend a vehicle.

The steering mechanism 114 and the propulsion mechanism 106 may be similar to a steering mechanism and propulsion mechanism of a bicycle or unicycle, such as shown in FIG. 5. The steering mechanism 114 and the propulsion mechanism 106 may be similar to that of an automobile.

The vehicle 100 may include one or more ball bearings 117 coupled between the magnet 102 and the ferrous surface 318.

Figure 2:
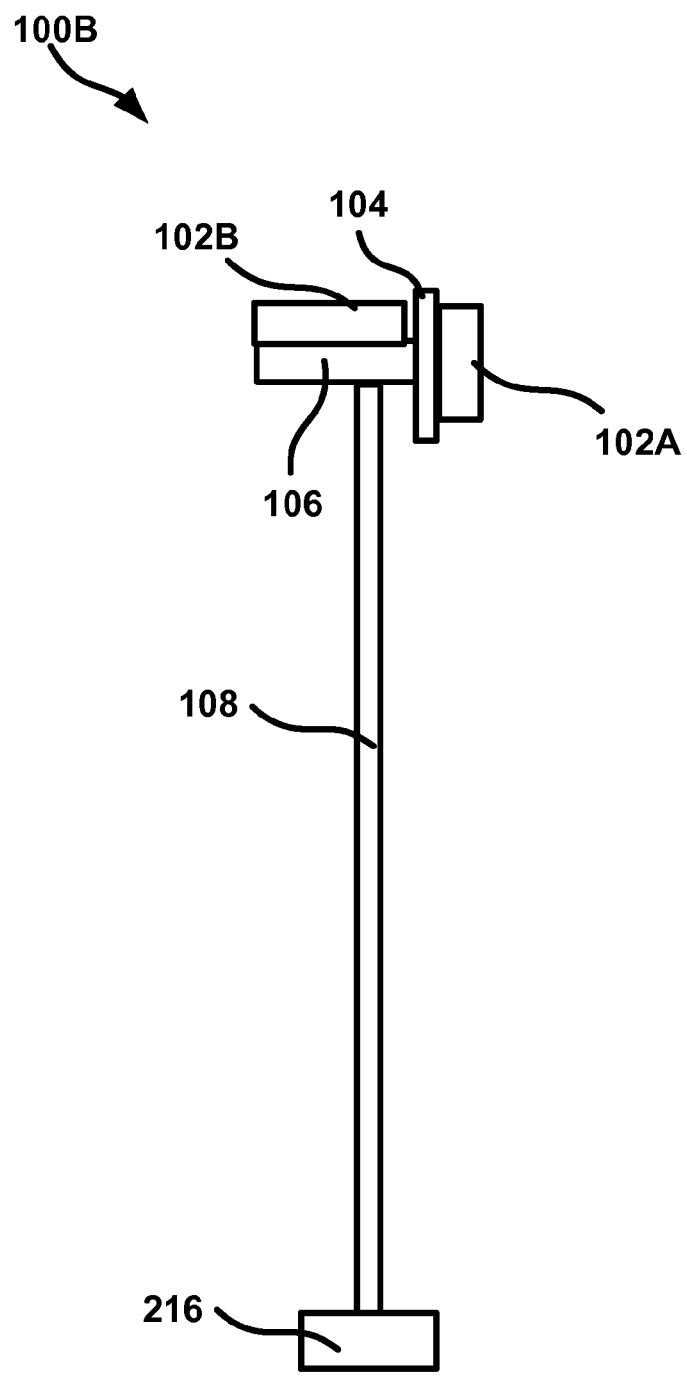
FIG. 2 is a block diagram of an example of another vehicle configured for magnetic suspension.

FIG. 2 illustrates an example of a vehicle 100B including a wheel 104 a propulsion mechanism 106, and two magnets 102A and 102B. The vehicle 100B may include a carriage 216 coupled to the stem 108. The carriage 216 may include a seat, an imaging device such as a camera. The camera may be operable to take pictures or videos in a variety of spectrums (e.g. x-ray, visual, radio, etc.). The carriage 216 may include a tool, such as a robot, eyedropper, container, petri dish, litmus paper, etc., that may be operable to capture a sample of, or data about, a medium that the tool is near, or at least partially in.

FIG. 3 illustrates an example of an example of a system 300. System 300 may include a vehicle 100C and a ferrous surface 318.

The vehicle 100C may include a transparent shell 320. The transparent shell 320 may protect a user or a carriage 216 from the elements external to the transparent shell 316 and vice versa. The transparent shell 316 may be spherical, such as is shown in FIG. 3, or other shapes. The transparent shell 316 may include an entry or exit portion operable to allow a user to enter or exit the transparent shell and access the cockpit 110.

The ferrous surface 318 may operate to magnetically couple to the vehicle 100. The ferrous surface 318 may include a footprint sufficient to allow a vehicle 100 to move about on a surface of the ferrous surface 318 and within the perimeter of the ferrous surface 318. The ferrous object 318 may be a ferrous surface 318. The ferrous surface 318 may include a varying topography, such as by including one or more protrusions 322, depressions 320, curvatures, slopes, or flat portions.

The vehicle 100C may include one or more ball bearings 117 coupled between the magnet 102 and the ferrous surface 318. Such a configuration may increase the strength of the magnetic coupling between the magnet 102 and the ferrous surface 318.

Figure 4:
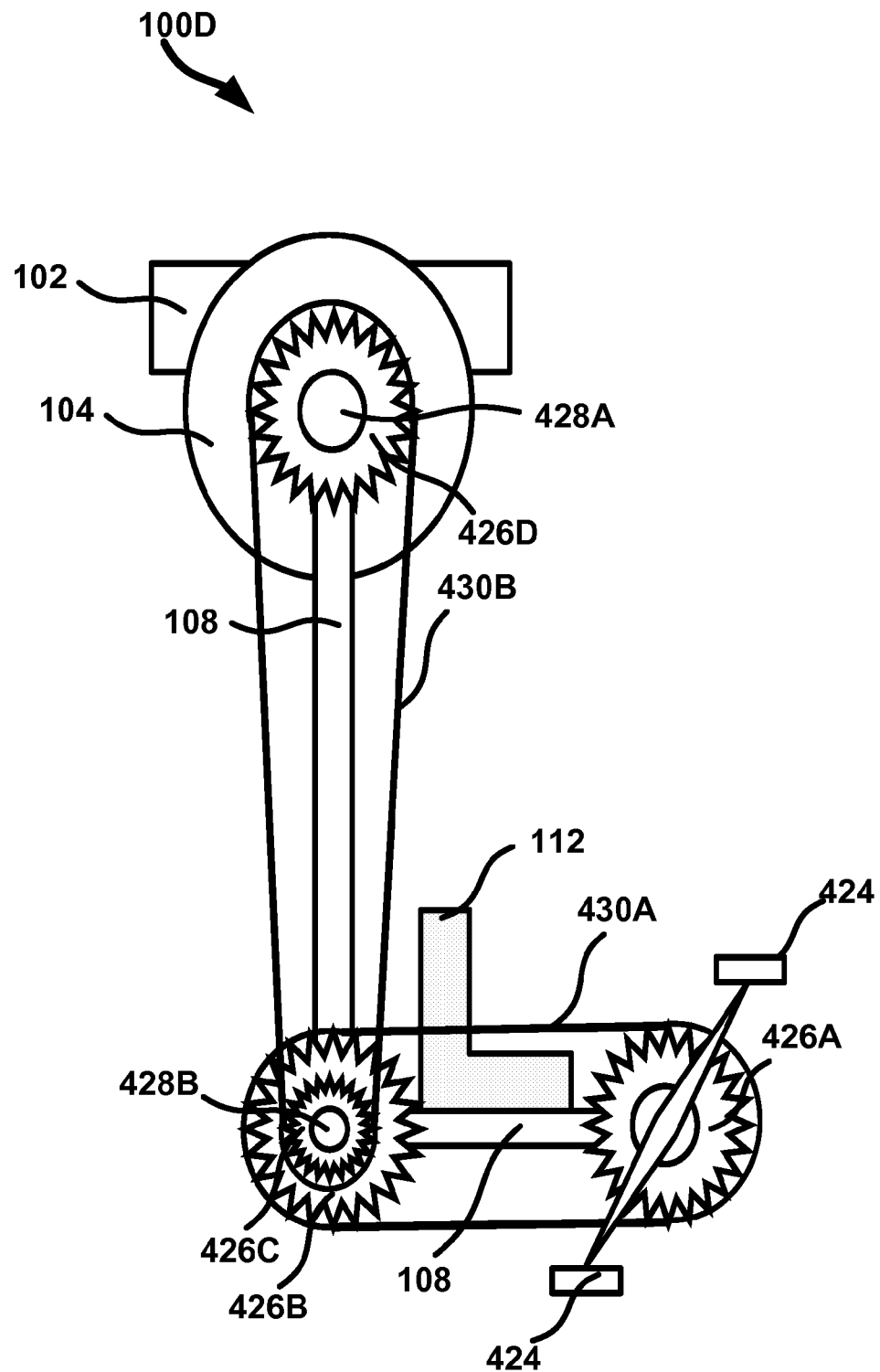
FIG. 4 is a block diagram of an example of another vehicle configured for magnetic suspension.

FIG. 4 illustrates an example of a vehicle 100D. The vehicle 100D may include a stem 108, a seat 112, one or more foot or hand pedals 424, one or more toothed cogs 426A-D, one or more axles 428A-B, or one or more chains 430A-B. The one or more pedals 424 may be mechanically coupled to one or more toothed cogs 426A-D such that when the one or more pedals 424 are engaged a mechanically coupled toothed cog 426A-D also turns. The one or more toothed cogs 426A-D may be mechanically coupled to the one or more pedals 424 through the one or more axles 428A-428B. Two or more toothed cogs 426A-D may be mechanically coupled to each other through the one or more chains 430A-B.

FIG. 5 illustrates an example of a vehicle 100E suspended from a ferrous surface 318 situated between one or more boats 532A-B floating on a surface of water. Such a configuration may be used for underwater exploration, research, or entertainment, for example, for undersea exploration, researching marine wildlife and or flora, or entertainment including coral reef viewing.

Figure 6:
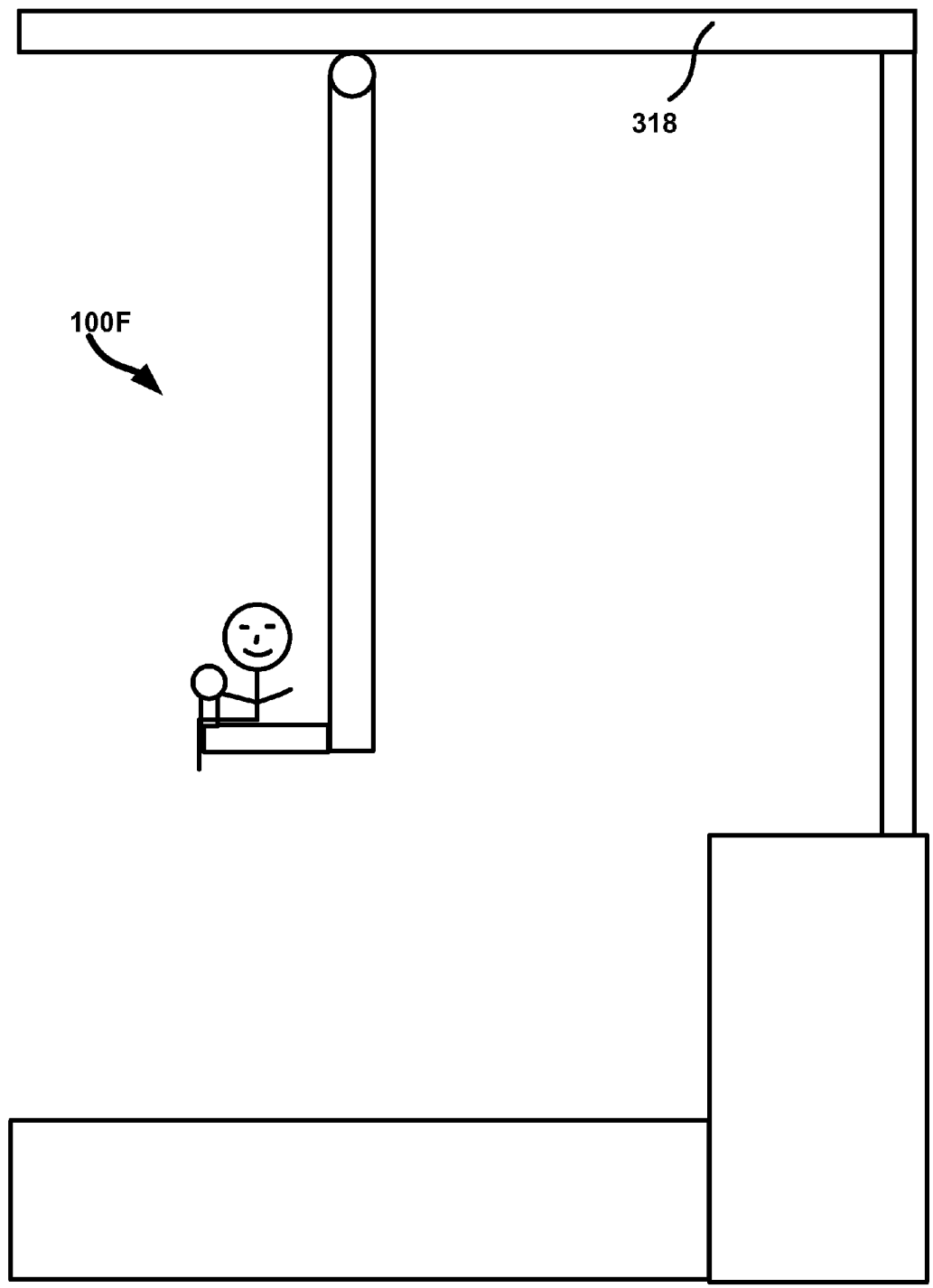
FIG. 6 is a block diagram of an example of another system configured to magnetically suspend a vehicle.

FIG. 6 illustrates an example of a vehicle 100F suspended from a ferrous surface 318 situated over land or water. Such a configuration may be used for exploration, research, or entertainment. A vehicle 100 may be at least partially suspended in water using a system similar to the system shown in FIG. 6. Such a configuration may be used for underwater exploration, research, or entertainment, such as in an aquarium or other body of water.

FIG. 7 illustrates an example of a vehicle 100G magnetically suspended from a ferrous surface 318 situated at least partially on, in, or over lands or water. Such a configuration may be used for exploration, research, or entertainment. A vehicle 100 may be suspended in water using a system similar to the system shown in FIG. 5. Such a configuration may be used for underwater exploration, research, or entertainment, such as in an aquarium or other body of water. The ferrous surface 318 may be situated vertically such as to allow a suspended vehicle 100G to traverse the ferrous surface 318 in a substantially vertical direction. While the FIGS. depict ferrous surfaces 318 situated substantially vertically or horizontally, the ferrous surface 318 may be situated at any angle between vertical and horizontal. While the FIGS. depict ferrous surfaces 318 as being substantially linear the ferrous surfaces 318 may be curved.

Figure 8A:
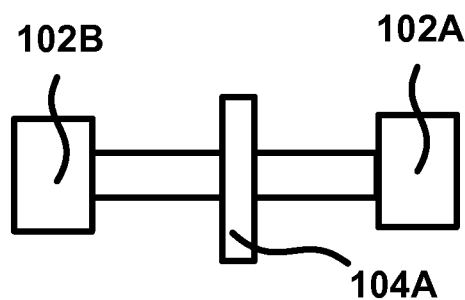
FIG. 8A is block diagram of an example of a magnet and wheel configuration.
Figure 8B:
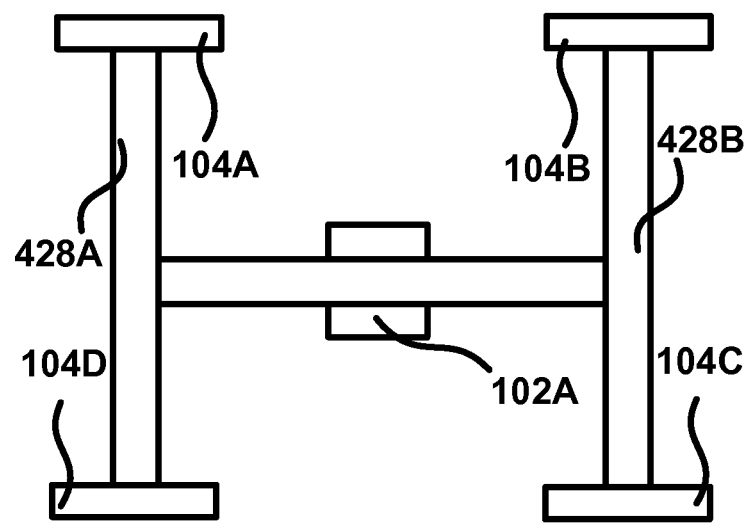
FIG. 8B is block diagram of another example of a magnet and wheel configuration.

FIGS. 8A-B illustrate examples of configurations of one or more wheels 104 and one or more magnets 102A-D that may be included on a vehicle 100. FIG. 8A shows a "unicycle" example with one wheel 104A flanked by two magnets 102A-B, one on each side of the wheel. FIG. 8B shows an example of four wheels 104A-D, similar to the four wheels of a standard automobile, coupled to a single magnet 102A.

FIG. 9 shows an example of a user interface 900 that may be included in a steering mechanism 114. Such a user interface 900 may be electrically coupled to circuitry configured to send wired or wireless electrical signal commands to the propulsion mechanism 106. The user interface 900 may be a touch screen or may include buttons 934A-B, 936A-D, or 938A-938B for sending commands to the propulsion mechanism 106 to move the vehicle 100. The commands may include commands to turn the wheels clockwise or counter-clockwise. For example, a user may, by pressing buttons 934A-934B send a command to the propulsion mechanism 106 indicating to move the vehicle clock-wise or counter-clockwise, respectively. The steering mechanism 114 can be remotely situated from the vehicle. Such a configuration can include sending wired or wireless command signals from the user interface 900 to the propulsion mechanism 106, such as to cause the propulsion mechanism 106 to propel the vehicle.

By activating button 936A a user may send a command to the propulsion mechanism 106 indicating to move the vehicle forward, for example. By activating button 936B a user may send a command to the propulsion mechanism 106 indicating to move the vehicle backward, for example. Similarly, by activating buttons 936C and 936D, a user may send a command (e.g., electrical signal) to the propulsion mechanism 106 indicating to move the vehicle to the left and right, respectively. The commands may include a command to start (e.g., such as by pressing button 938A) the propulsion mechanism 106 and/or stop (e.g., such as by pressing button 938B) the propulsion mechanism.

Figure 10:
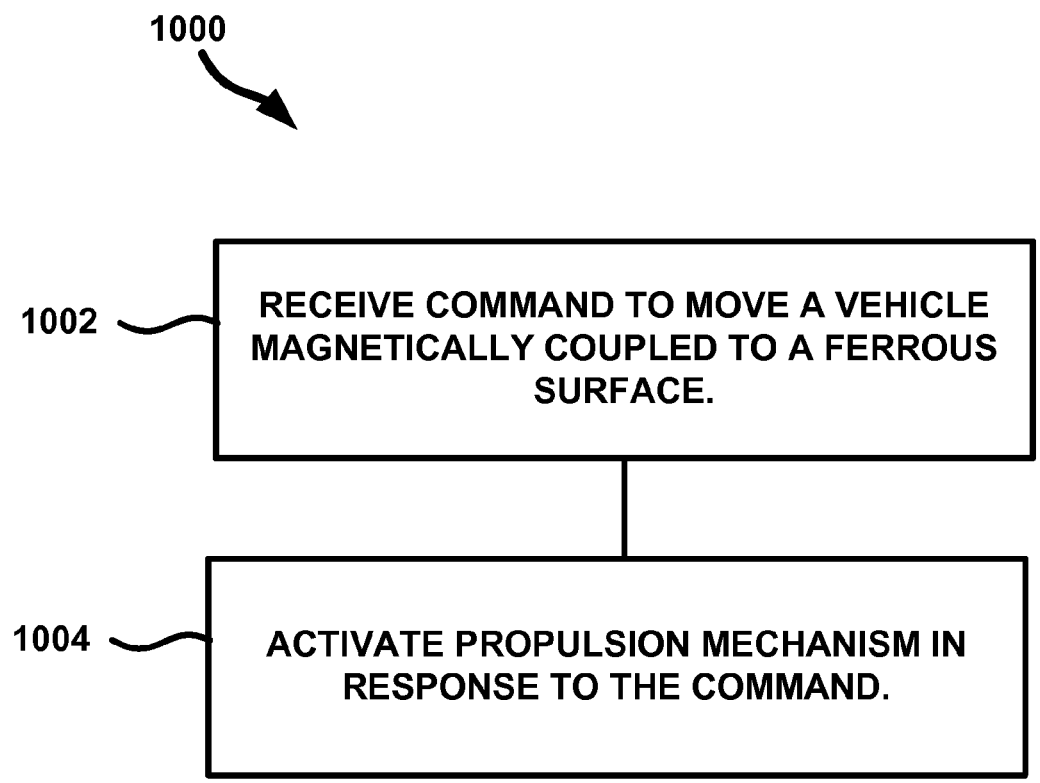
FIG. 10 is a flow diagram of an example of a technique for using a vehicle configured for magnetic suspension.

FIG. 10 illustrates an example of a technique 1000 for using a vehicle 100 or system discussed or suggested herein. The method 900 may include receiving 1002 a command (e.g., in response to a user pressing a button on the user interface 900 or mechanically engaging a steering mechanism 114 or propulsion mechanism 106) to move a vehicle magnetically coupled to a ferrous surface 318. The command may be received at the steering mechanism 114 or propulsion mechanism 106, such as in response to a user engaging the one or more pedals 424, or pressing or touching a button on a user interface 900 to send an electrical signal to a motor. A propulsion mechanism 106, which may be similar to that of an automobile or a bicycle, may be activated 1004, in response to the command. Activating the propulsion mechanism 106 may cause a wheel 104 to spin causing the vehicle to move along the ferrous surface 318.

ADDITIONAL NOTES AND EXAMPLES

In Example 1 a vehicle may be configured to be magnetically suspended and may include a steering mechanism and a propulsion mechanism coupled to the steering mechanism.

In Example 2, the vehicle of Example 1 may include a first end of a stem coupled to the propulsion mechanism.

In Example 3, the vehicle of at least one of Examples 1-2 may include at least one wheel in or coupled to the propulsion mechanism, and at least one magnet coupled to the stem, wherein the magnet is configured to suspend the vehicle from a ferrous surface when the magnet is situated at or near the ferrous surface.

In Example 4, the vehicle of at least one of Examples 1-3 may include a carriage and or a seat coupled to a second end of the stem, the second end of the stem opposite the first end of the stem.

In Example 5, the magnet of at least one of Examples 1-4 may include at least one ball bearing coupled thereto and can be configured to suspend the vehicle when a gap exists between the magnet and the ferrous surface.

In Example 6, the magnet and the propulsion mechanism of at least one of Examples 1-5 may be situated adjacent to the at least one wheel, and the magnet may be disposed at or near the first end of the stem.

In Example 7, the vehicle of at least one of Examples 1-6 may include a waterproof shell surrounding the seat.

In Example 8, the steering mechanism of at least one of Examples 1-7 may include a steering wheel and stop and go pedals.

In Example 9, the vehicle of at least one of Examples 1-8 may include a processor and a user interface, the processor operable to receive commands through the user interface and control the propulsion mechanism in response to the commands.

In Example 10, the propulsion mechanism of at least one of Examples 1-9 includes a motor and an axle.

In Example 11, the propulsion mechanism of at least one of Examples 1-10 includes at least one toothed cog, and at least one chain.

In Example 12, the vehicle of at least one of Examples 1-11 may be magnetically coupled to a ferrous surface when the magnet is situated at or near the ferrous surface.

In Example 13, the seat and steering mechanism of at least one of Examples 1-12 may be encased in a waterproof shell.

In Example 14, the motor and axle of at least one of Examples 1-13 is mechanically coupled to the at least one wheel.

In Example 15, the propulsion mechanism of at least one of Examples 1-14 may include at least two toothed cogs and at least one chain, a toothed cog of the at least two toothed cogs coupled to a wheel of the at least one wheel and coupled to another toothed cog of the at two toothed cogs.

In Example 16 a technique may include receiving, at a propulsion mechanism, a command to move a vehicle magnetically suspended from a ferrous surface.

In Example 17, the technique of at least one of Examples 1-16 may include, in response to receiving the command, activating a propulsion mechanism of the vehicle to (1) spin at least one wheel coupled to the propulsion mechanism and (2) move the vehicle along the ferrous surface.

In Example 18, receiving the command to move the vehicle of at least one of Examples 1-17 may include a user operating pedals to engage at least one toothed cog and at least one chain coupled to a wheel of the at least one wheels.

In Example 19, receiving the command to move the vehicle of at least one of Examples 1-18 may include receiving the command from a handheld steering mechanism.

In Example 20, the vehicle of at least one of Examples 1-19 may include one or more ball bearings electrically or mechanically coupled to the magnet.

The above detailed description comprises references to the accompanying drawings, which form a part of the detailed description. The drawings show, by way of illustration, specific embodiments in which the invention may be practiced. These embodiments are also referred to herein as "examples." Such examples may comprise elements in addition to those shown or described. However, the present inventor also contemplates examples in which only those elements shown or described are provided. Moreover, the present inventor also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to comprise one or more than one, independent of any other instances or usages of "at least one" or "one or more." In this document, the term "or" is used to refer to a nonexclusive or, such that "A or B" comprises "A but not B," "B but not A," and "A and B," unless otherwise indicated. In this document, the terms "comprising" and "in which" are used as the plain English equivalents of the respective terms "comprising" and "wherein." Also, in the following claims, the terms "comprising" and "wherein" are open-ended, that is, a system, device, article, composition, formulation, or process that comprises elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may comprise a computer-readable medium or machine-readable medium encoded with instructions operable to configure an electronic device to perform methods in conjunction with mechanical devices as described in the above examples. An implementation of such methods may comprise code, such as microcode, assembly language code, a higher-level language code, or the like. Such code may comprise computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may comprise, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be taught, such as to one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

What is claimed is:

1. A system comprising:
   a ferrous surface; and
   a vehicle comprising:
   at least one magnet magnetically coupled to the ferrous surface;
   a ball bearing coupled to the magnet and situated between the magnet and the ferrous surface;
   a steering mechanism configured for selecting a direction comprising any one of all directions parallel to the ferrous surface from which the vehicle is suspended;
   a propulsion mechanism coupled to the steering mechanism configured to propel the vehicle in the selected direction;
   a stem including first and second ends, the first end connected to the steering mechanism and the second end connected to the propulsion mechanism; and
   at least one wheel coupled to the propulsion mechanism;
   wherein the at least one magnet is coupled to the stem and configured to suspend the vehicle from the ferrous surface when the at least one magnet is situated at or near the ferrous surface;
   wherein the steering mechanism comprises a steering wheel, and the propulsion mechanism comprises at least two toothed cogs and at least one chain, a toothed cog of the at least two toothed cogs coupled to a wheel of the at least one wheel and coupled to another toothed cog of the at least two toothed cogs.

2. The system of claim 1, further comprising a seat coupled to the stem at or near the first end of the stem.

3. The system of claim 1, wherein the at least one magnet and the propulsion mechanism are situated adjacent to the at least one wheel, and wherein the at least one magnet is situated at or near the second end of the stem.

4. The system of claim 1, wherein a seat and steering mechanism are encased in a waterproof shell.

5. The system of claim 1, wherein the steering mechanism comprises a steering wheel and the propulsion mechanism comprises stop and go pedals.

6. The system of claim 1, wherein the vehicle further comprises a processor and a user interface, the processor configured to receive commands from a user through the user interface and control the propulsion mechanism in response to the received commands.

7. The system of claim 1, wherein the propulsion mechanism comprises a motor and at least one axle coupled to the at least one wheel.

\* \* \* \* \*